(12) United States Patent
Maglione

(10) Patent No.: US 11,106,054 B2
(45) Date of Patent: Aug. 31, 2021

(54) EYEWEAR WITH ADJUSTABLE STRAP

(71) Applicant: Clic Goggles, Inc., Corte Madera, CA (US)

(72) Inventor: Massimo Maglione, Rome (IT)

(73) Assignee: Clic Goggles, Inc., Corte Madera, CA (US)

( * ) Notice: Subject to any disclaimer, the term of this patent is extended or adjusted under 35 U.S.C. 154(b) by 119 days.

(21) Appl. No.: 16/679,758

(22) Filed: Nov. 11, 2019

(65) Prior Publication Data

US 2020/0081267 A1    Mar. 12, 2020

Related U.S. Application Data

(63) Continuation of application No. 16/052,548, filed on Aug. 1, 2018, now Pat. No. 10,732,433.

(51) Int. Cl.
*G02C 3/00* (2006.01)
*G02C 5/02* (2006.01)
(Continued)

(52) U.S. Cl.
CPC .............. *G02C 3/003* (2013.01); *G02C 3/006* (2013.01); *G02C 5/02* (2013.01); *G02C 5/20* (2013.01);
(Continued)

(58) Field of Classification Search
CPC . G02C 3/02; G02C 3/003; G02C 3/04; G02C 2200/02; G02C 11/00; G02C 5/143;
(Continued)

(56) References Cited

U.S. PATENT DOCUMENTS 5,313,671 A * 5/1994 Flory ................... A63B 33/002
                                                     2/428
6,253,388 B1 * 7/2001 Lando ..................... A61F 9/02
                                                     2/445
(Continued)

*Primary Examiner* — Collin X Beatty
*Assistant Examiner* — Grant A Gagnon
(74) *Attorney, Agent, or Firm* — Bay Area Technology Law Group PC

(57) ABSTRACT

Eyewear in the form of a pair of lenses and a pair of frame halves, each frame half supporting a lens. The frame halves are releasably connected to one another at the bridge between the lenses at their inner ends and the frame halves have frame half outer ends on opposite sides of the lenses from the bridge. The eyewear also includes first and second temples having temple first ends and temple second ends, the temple first ends being pivotally connected to the frame halves outer ends, each temple including a channel. The eyewear also includes a flexible strap having first and second flexible strap ends, to which are affixed first and second sliders, each slider affixed to one end of the flexible strap at the first and second flexible strap ends. The first slider is located within the channel of the first temple and sized to be slidably positioned along the channel of the first temple and the second slider is located within the channel of the second temple and sized to be adjustably positioned along the channel of the second temple, the sliders having protrusions and the channels having indents for receiving the protrusions, such that movement of the sliders enables a user to selectively change the length of the flexible strap extending between the second ends of the first and second temples.

11 Claims, 5 Drawing Sheets

(51) Int. Cl.
*G02C 5/20* (2006.01)
*G02C 5/00* (2006.01)
*B29D 12/02* (2006.01)

(52) U.S. Cl.
CPC .............. *B29D 12/02* (2013.01); *G02C 5/008* (2013.01); *G02C 2200/02* (2013.01)

(58) Field of Classification Search
CPC ........ G02C 11/10; G02C 3/006; G02C 5/006; G02C 11/04; G02C 5/16; G02C 13/003; G02C 13/005; G02C 3/00; G02C 5/008; G02C 5/146; G02C 13/00; G02C 2200/10; G02C 5/06; G02C 5/08; G02C 5/18; G02C 5/20; G02C 9/00; G02C 9/04; G02C 11/02; G02C 11/08; G02C 13/001; G02C 2200/04; G02C 2200/18; G02C 2200/20; G02C 5/128; G02C 5/14; G02C 5/22; G02C 7/06; G02C 7/066; G02C 7/086; G02C 7/10; G02C 7/14
USPC ........................................................ 351/155
See application file for complete search history.

(56) References Cited

U.S. PATENT DOCUMENTS 7,399,079 B2 * 7/2008 Skuro .................... G02C 3/003
351/113
9,588,354 B2 * 3/2017 Cabre Ozores ........ G02C 3/006

* cited by examiner

EYEWEAR WITH ADJUSTABLE STRAP

TECHNICAL FIELD

The present invention deals with improved eyewear having a snap-together bridge feature. The eyewear includes a unique temple/strap arrangement which facilitates the application and removal of the eyewear as well as providing firm support of the eyewear when desired.

BACKGROUND OF THE INVENTION

Applicant is the owner of U.S. Pat. Nos. 6,253,388 and 7,931,366. The invention disclosed and claimed in the '388 patent involved eyewear comprised of a pair of lenses, releasable connectors connecting the respective inner ends of the lenses, a pair of temple pieces pivotable with respect to outer ends of the lenses and a rigid strap attached to rear ends of the temple pieces including an arc-shaped base bridging the parallel legs. The strap was taught to be positioned below the lenses so as not to interfere with, for example, the hairdo of a user. The inner ends of the lenses were taught to be releasably secured to each other by connectors, preferably, by magnets. To position the eyewear, the lenses are first separated from each other and pivoted inwardly or outwardly. The strap is then wrapped around the back of the user's head and the lenses pivoted toward each other and secured together in the front of the user's eyes. The lenses were taught to be instantly separable to facilitate putting on and taking off the eyewear and instantly connectable for a secure and accurate fit. The disclosure of the '388 patent is hereby incorporated by reference herein.

Applicant's U.S. Pat. No. 7,931,366 represented an improvement over the '388 patent by calling for a telescoping segment located within the arc-shaped base of the eyewear's strap to selectively alter the length of the arc-shaped base for modifying the spacing between the substantially parallel legs of the rigid strap to adjust the strap to varying widths of a user's head. Although doing so greatly expanded the flexibility of applicant's eyewear enabling it to be accommodated by users of different head sizes, it was determined by applicant that its eyewear could benefit yet further by additional modification.

Because of the relative stiffness of the eyewear's strap, comfort was somewhat compromised as well as the ability to compactly store the eyewear when not in use. In addition, once a user employed the eyewear, there was no significant resistance for keeping the frame on the bridge of one's nose particularly if the user was to bend over or engaged in physical activity. Others, including applicant, have somewhat addressed this issue by providing a relatively flexible strap as an alternative to the strap taught in the '388 and '366 patents but such a strap would generally hanging on a user's neck offering little resistance to dislodgment of the eyewear noting further that the weight of the strap could often times pull upon the eyewear's temples and cause the lenses to lift at its bridge resulting in discomfort and possibly compromise vision acuity.

Is thus an object to the present invention to provide eyewear having the above-described releasable connector feature while avoiding the limitations of the prior art.

It is still a further object of the present invention to provide eyewear having the above-describe releasable connector feature while still providing the user with a convenient means to apply and remove the eyewear while facilitating its firm application by providing a strap which can be conveniently shortened by a user in order to secure the frame where desired.

These and further objects be more readily apparent when considering the following disclosure and appended claims.

SUMMARY OF THE INVENTION

Eyewear comprising:
a pair of lenses;
a pair of frame halves, each frame half supporting a lens, said frame halves being releasably connected to one another at a bridge between said lenses at their inner ends and said frame halves having frame half outer ends on opposite sides of said lenses from said bridge;
first and second temples having temple first ends and temple second ends, said temple first ends being pivotally connected to said frame halves outer ends, each temple comprising a channel comprised of opposing rails defining said spacing and having indents formed therein;
a flexible strap having first and second flexible strap ends;
first and second sliders, each slider affixed to one end of said flexible strap at said first and second flexible strap ends, said sliders having protrusions;
said first slider sized to be slidably positioned along said channel of said first temple and said second slider sized to be adjustably positioned along said channel of said second temple; and
wherein movement of said sliders enables a user to selectively change the length of said flexible strap extending between said second ends of said first and second temples wherein inadvertent movement of said sliders within said channels is resisted by indent-protrusion contact between said sliders and channels.

Eyewear comprising:
a pair of lenses;
a pair of frame halves, each frame half supporting a lens, said frame halves being releasably connected to one another at a bridge between said lenses at their inner ends and said frame halves having frame half outer ends on opposite sides of said lenses from said bridge;
first and second temples of rigid but deformable opposing rails having a plurality of indents formed therein and having temple first ends and temple second ends, said temple first ends being pivotally connected to said frame halves outer ends, each temple comprising a channel defined by spacing between said opposing rails;
a flexible strap having first and second flexible strap ends;
first and second sliders, each slider affixed to one end of said flexible strap at said first and second flexible strap ends, said sliders having protrusions such that said sliders deform the spacing between opposing rails at locations devoid of said indents;
said first slider sized to be slidably positioned along said channel of said first temple and said second slider sized to be adjustably positioned along said channel of said second temple; and
wherein movement of said sliders enables a user to selectively change the length of said flexible strap extending between said second ends of said first and second temples wherein inadvertent movement of said sliders within said channels is resisted by indent-protrusion contact between said sliders and channels.

A method of applying eyewear to the head of a user, said method comprising providing eyewear comprising:
a pair of lenses;

a pair of frame halves, each frame half supporting a lens, said frame halves being releasably connected to one another at a bridge between said lenses at their inner ends and said frame halves having frame half outer ends on opposite sides of said lenses from said bridge;

first and second temples having temple first ends and temple second ends, said temple first ends being pivotally connected to said frame halves outer ends, each temple comprising a channel comprised of opposing rails defining said spacing and having indents formed therein;

a flexible strap having first and second flexible strap ends;

first and second sliders, each slider affixed to one end of said flexible strap at said first and second flexible strap ends, said sliders having protrusions;

said first slider sized to be slidably positioned along said channel of said first temple and said second slider sized to be adjustably positioned along said channel of said second temple; and wherein movement of said sliders enables a user to selectively change the length of said flexible strap extending between said second ends of said first and second temples wherein inadvertent movement of said sliders within said channels is resisted by indent-protrusion contact between said sliders and channels;

moving said sliders along said channels away from said frame halves for lengthening said flexible strap extending from said temples;

separating said frame halves from one another at the frame halves inner ends at said bridge;

applying the eyewear by connecting the frame halves at the bridge between the lenses with the flexible strap extending across the neck of the user; and moving said first and second sliders within said channels towards said frame halves to shorten the flexible strap that extends beyond said temples.

DETAILED DESCRIPTION OF THE INVENTION

Figure 1:
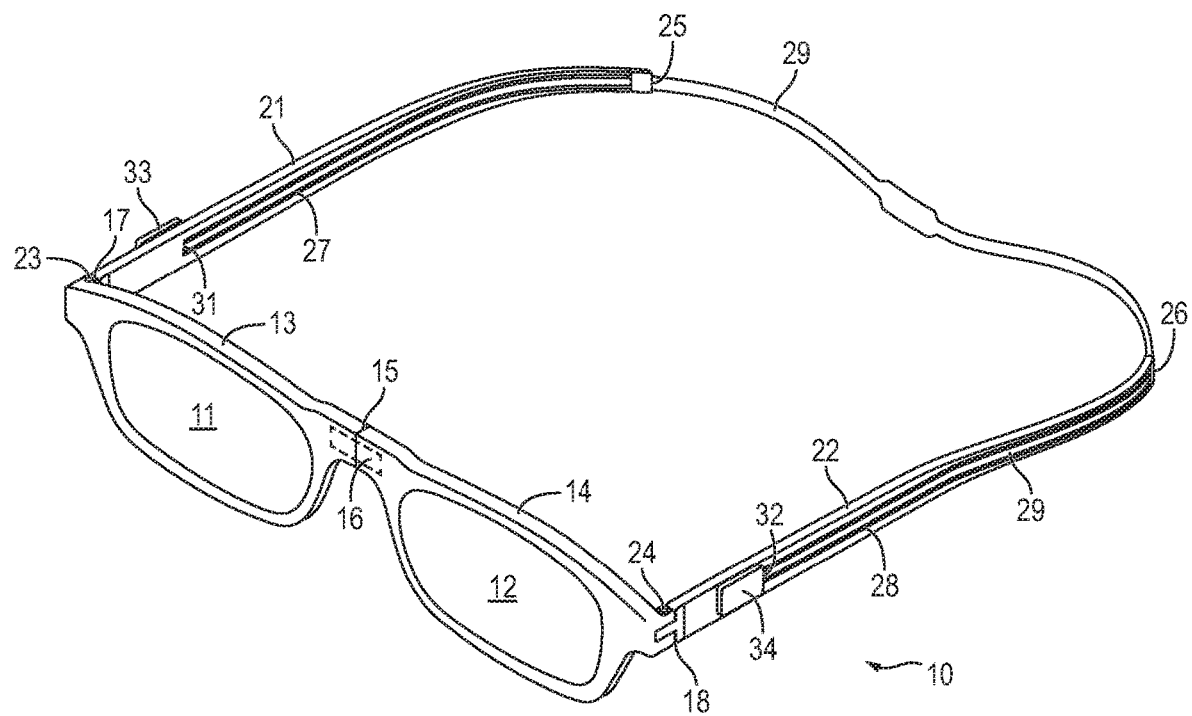
FIG. 1 is a perspective view of the eyewear of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

As noted previously, although front connection eyewear is well known, such eyewear is generally been characterized as having relatively stiff straps or straps which not readily adjust. Further, because of the relative stiffness of the eyewear's strap, comfort was somewhat compromised as well as the ability to compactly store the eyewear when not in use. In addition, once a user employed the eyewear, there was no significant resistance for keeping the frame on the bridge of one's nose particularly if the user was to bend over or engaged in physical activity.

Others, including applicant, have somewhat addressed this issue by providing a relatively flexible strap as an alternative to the strap taught in the '388 and '366 patents but such a strap would generally hanging on a user's neck offering little resistance to dislodgment of the eyewear noting further that the weight of the strap could often times pull upon the eyewear's temples and cause the lenses to lift at its bridge resulting in discomfort and possibly compromise vision acuity. The present invention addresses these issues as depicted in the drawings which accompanied this disclosure. In this regard, reference is first made to FIG. 1.

In turning to FIG. 1, eyewear 10 is illustrated having lens pair 11 and 12 and frame halves 13 and 14 releasably connected to one another at bridge 15 between lenses 11 and 12 at their inner ends. Preferably, frame halves 13 and 14 are releasably connected at bridge 15 using magnet pair 16. Frame halves 13 and 14 have frame halves outer ends 17 and 18 on opposite sides of lenses 11 and 12 from bridge 15.

Eyewear 10 is further characterized as having first and second temples 21 and 22 having temple first ends 23 and 24 and temple second ends 25 and 26, the temple first ends being pivotally connected to frame halves outer ends 17 and 18.

Figure 2:
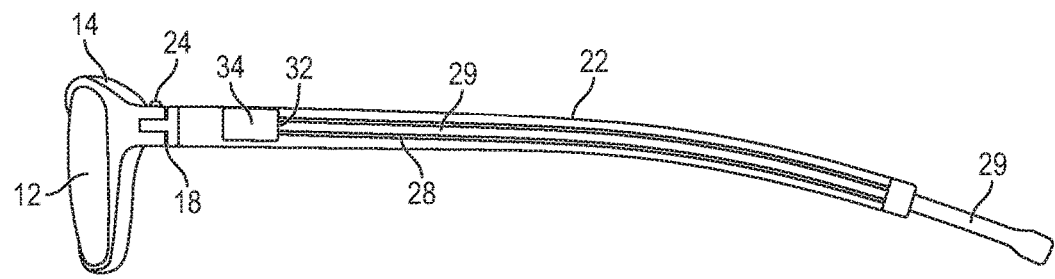
FIG. 2 is a side view of one embodiment of the eyewear of the present invention.

Temples 21 and 22 are further characterized as having channels 27 and 28. Flexible strap 29 is provided having first flexible strap end 31 and second flexible strap end 32 as shown. First slider 33 is located partially within channel 27 being affixed to flexible strap end 31 and sized to be slidably positioned along channel 27 of first temple 21 and second slider 34 is located partially within channel 28 being affixed to flexible strap end 32 and sized to be slidably positioned along channel 28 of second temple 22. As first slider 33 and second slider 34 are affixed to ends 31 and 32 of flexible strap 29, respectively, as a user moves the sliders within their respective channels, the length of flexible strap 29 extending between second ends 25 and 26 of first and second temples 21 and 22 can be selectively changed. It is further to be noted that in the embodiment depicted in FIGS. 1 and 2, sliders 33 and 34 are sized with respect to channels 27 and 28 such that movement of the sliders within the channels is resisted by frictional contact between the sliders in their respective temples.

Figure 5:
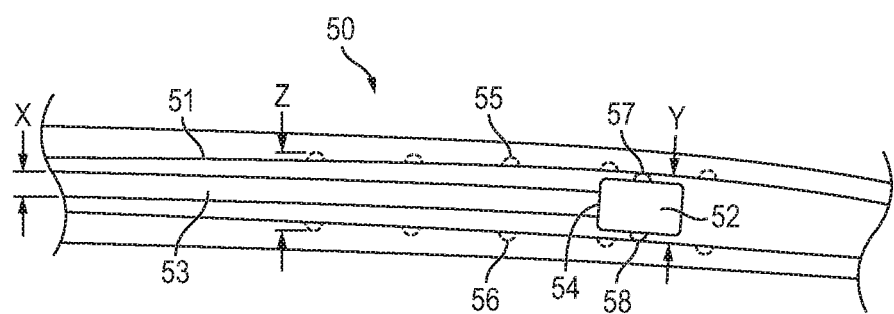
FIG. 5 is a side view of a second embodiment of the eyewear of the present invention.

As an alternative embodiment, reference is made to FIG. 5 depicting temple 50 having channel 51 and slider 52, the latter being a fixed to end 54 of strap 53. In this embodiment, unintended movement of slider 52 is resisted through the use of indents 55/56 configured within channel 51 and corresponding protrusions 57/58 of slider 52. This snap-fit engagement resists inadvertent movement of slider 52 within channel 51 and is an effective alternative to the frictional resistance inherent in the embodiment of FIGS. 1 and 2.

Turning again to FIG. 5, channel 53 is defined by rails creating spacing X there between to enable slider 52 to move there along. The rails are configured with indents 55/56 while slider 52 is provided with protrusions 57/58. The spacing Z between the ends of the indents 55/56 is approximately equal to the spacing between the ends of protrusions 57/58. As the spacing is greater than the spacing X of channel 53, protrusions 57/58 deform the rails creating spacing Y between opposing rails at locations devoid of indents 55/56. This relationship assists the user in seating slider 52 at locations along temple 50 where protrusions 57/58 can seat within indents 55/56.

The embodiment of FIG. 5 provides certain distinct advantages. Recognizing that frame halves 13/14 are releasably connected at the bridge of user's nose by means which provide convenient disconnect/connect capabilities, such as through the use of magnets 16, it is important that the length of strap 29 be such as to enable the user to rest the eyewear on his or her nose bridge snugly while avoiding inadvertent release which would result from a strap length which is too short. Ordinarily, a user would move slider 52 (and its corresponding counterpart) away from frame halves 13/14 for lengthening that portion of flexible strap 29 that extends from temples 50. The frame halves would then be separated from one another at the frame halves inner ends at the eyewear bridge. The eyewear would then be applied to the front of the user's face by connecting the frame halves, generally by magnetic attraction, with the flexible strap extending across the neck of the user. The user would then move the sliders within their respective channels towards the frame halves to shorten that portion of the flexible strap that extends beyond the temples. In doing so, the lenses would seat in front of the user's eyes snugly thus preventing inadvertent movement and yet the adjusted eyewear would not seat so snugly as to cause inadvertent release of the frame halves from one another. Preferably, this ideal length is achieved while protrusions 57/58 seat within indents 55/56. Thus, the achieved length of strap 29 extending beyond the second ends of the temples would be somewhat fixed through protrusions/indent matching such that as eyewear 10 is repeatedly removed from the face of the user and allowed to hang about the user's neck ((FIG. 4A) only to be reapplied to the face of the user (FIG. 4B), the user need not continuously readjust the strap length to achieve optimal comfort.

Figure 3A:
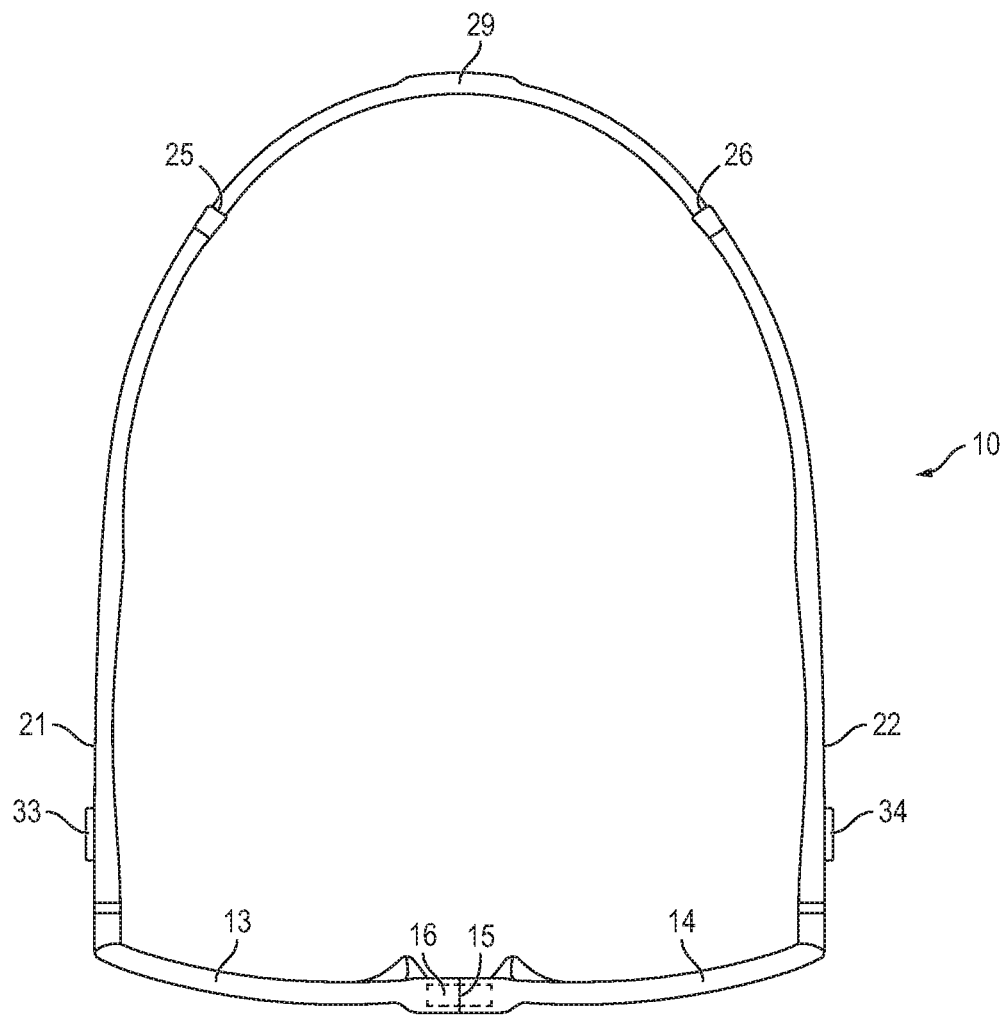
FIGS. 3A and 3B are top views of the eyewear of the present invention depicting to of its alternative orientations.
Figure 3B:
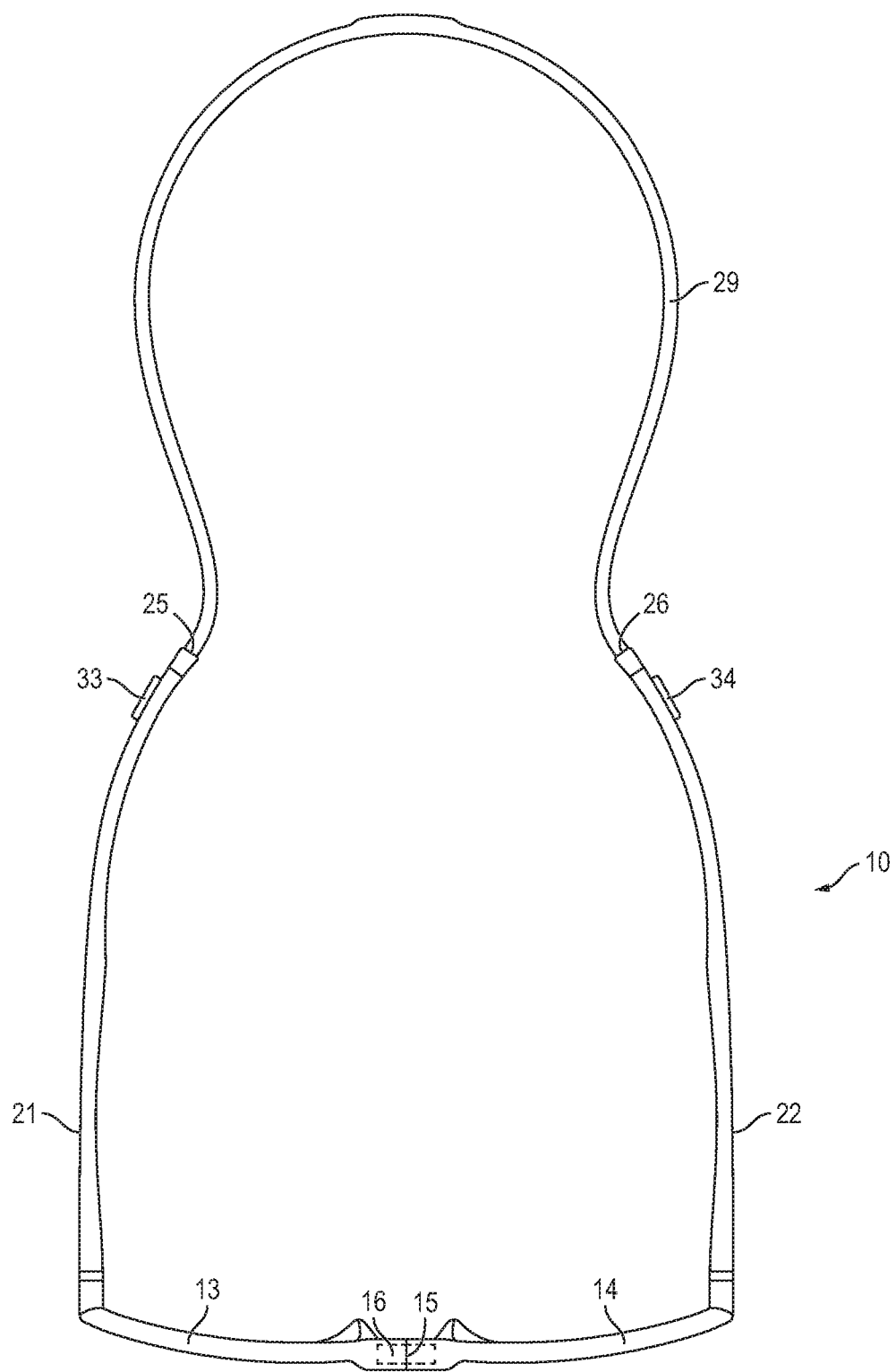

Regardless of the embodiment, sliders 33/34 and 52 are preferably sized to enable user to grasp them using one's thumbs and forefingers for movement of the sliders along their respective channels. In comparing FIGS. 3A and 3B, it is apparent that as sliders are moved towards temple second ends 25/26, the length of strap 29 there between lengthens and, conversely, as sliders 33/34 are moved toward temple first ends 23/24, the length of strap 29 there between shortens. It should be noted that stop 29 is continuous from end to end unlike competitive straps that usually have a cinch or releasable break to facilitate application and removal of the eyewear by its user. The present eyewear having front connection capability eliminates the need for a discontinuous strap making application and removal much more convenient and aesthetically much more appealing.

As previously noted, the temples of the present invention are intended to be semirigid while the straps employed herein are more flexible. As a preferred embodiment, the temples used herein can comprise TR90 polymer while the straps comprising an elastomeric material such as a thermoplastic polyester elastomer.

Figure 4A:
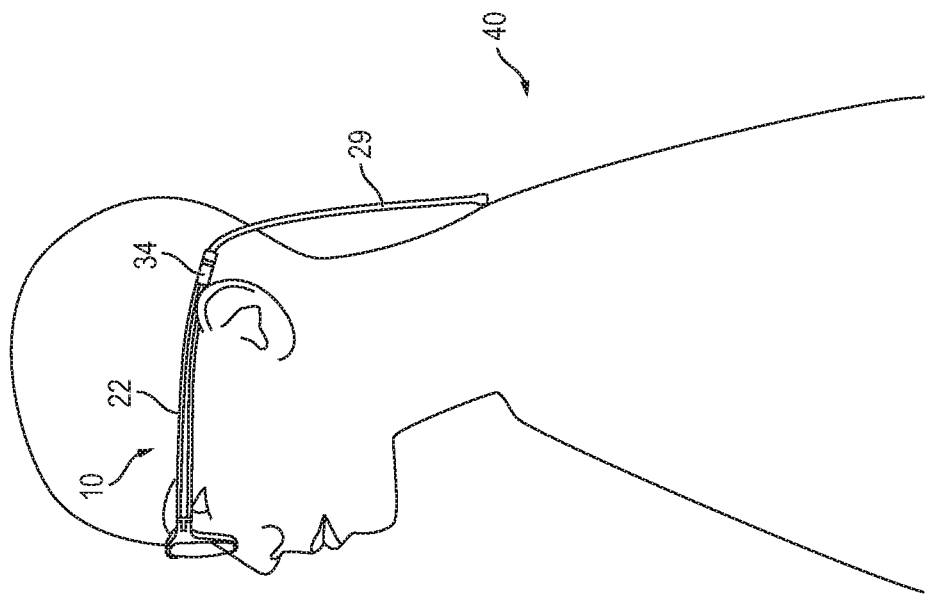
FIGS. 4A-4C depict a user during stages of applying and adjusting the eyewear of the present invention.
Figure 4B:
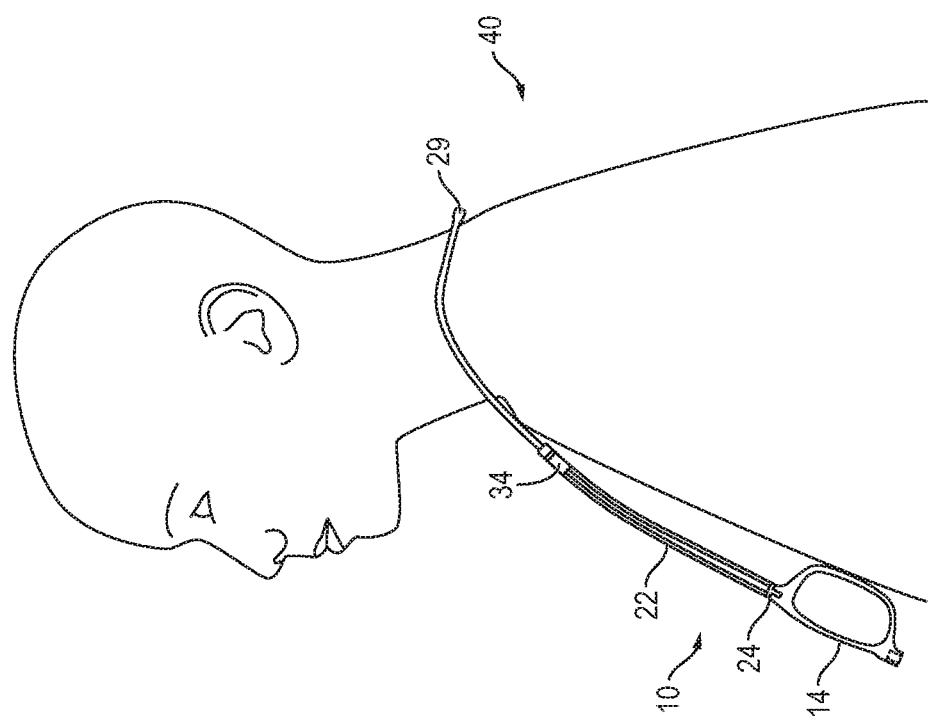
Figure 4C:
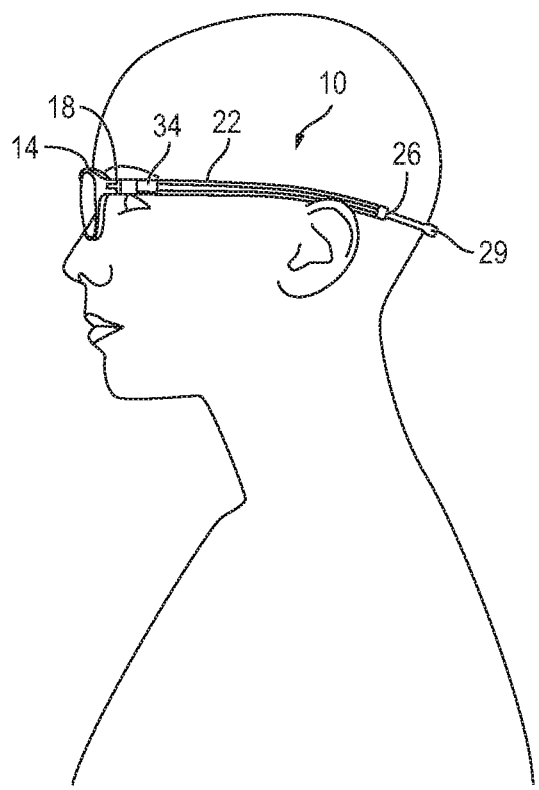

Reference is now made to FIGS. 4A-4C illustrating how a typical user would apply the present eyewear taking advantage of the inherent benefits in practicing the present invention.

Again, first referring to FIG. 4A, eyewear 10 would drape along the neck of user 40 with strap 29 going about the nape of the user's neck while temple 22 (and corresponding temple 21, not shown) hangs on the chest of the user with frame half 14 (and corresponding frame half 13, not shown) extending linearly therefrom as the frame halves have been separated at bridge 15 by separating magnetic connectors 16.

In turning to FIG. 4B, user 40 would then apply eyewear 10 by connecting frame halves 13 and 14 at its bridge as magnetic connector 16 would releasably attach the frame halves as shown in FIG. 1. It is noted that upon applying eyewear 10, flexible strap 29 would hang at the back of the user's head providing no significant support to the eyewear and, in fact, potentially representing an impediment in its use as the weight of strap 29 could pull against ends 25 and 26 of its temples and cause frame halves 13 and 14 two lift from the users bridge unintentionally. To remedy this situation, as depicted in FIG. 4C, slider 34 is moved from second end 26 of temple 22 to first end 24 of temple 22 thus shortening the distance that strap 29 extends between ends 25 and 26 of temples 21 and 22 lifting strap 29 from the nape of the user's neck to the back of the user's head thus reducing potential lift upon frame members 13 and 14 and acting to pull the frame members against the users face (if desired) to avoid unintended dislodgment of the eyewear from the users bridge.

The benefits derived from practicing the present invention are numerous. The invention enables the convenient application and removal of the described eyewear while providing a positive user experience. This is accomplished without the need to employ a strap with a cinch or similar adjustable feature which can prove to be unsightly particularly if the eyewear is intended to be used in a formal rather than casual setting. Adjustability is achieved simply by enabling the user to position sliders along the eyewear's temples using one's thumbs and forefingers to enable unlimited adjustability. Thus, if the eyewear, once applied, is too tight, one need only move the sliders toward the second or rear end of the temples while, conversely, if the eyewear is too loose and, for example, slips from the users bridge during bending over or engage in physical activity, one need only move the sliders forward toward the eyewear's frames.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. Eyewear comprising:
   a pair of lenses;
   a pair of frame halves, each frame half supporting a lens, said frame halves being releasably connected to one another at a bridge between said lenses at their inner ends and said frame halves having frame half outer ends on opposite sides of said lenses from said bridge;
   first and second temples having temple first ends and temple second ends, said temple first ends being pivotally connected to said frame halves outer ends, each temple comprising a channel comprised of opposing rails defining said spacing and having indents formed therein;
   a flexible strap having first and second flexible strap ends;
   first and second sliders, each slider affixed to one end of said flexible strap at said first and second flexible strap ends, said sliders having protrusions;
   said first slider sized to be slidably positioned along said channel of said first temple and said second slider sized to be adjustably positioned along said channel of said second temple; and
   wherein movement of said sliders enables a user to selectively change the length of said flexible strap extending between said second ends of said first and second temples wherein inadvertent movement of said sliders within said channels is resisted by indent-protrusion contact between said sliders and channels.

2. The eyewear of claim 1 wherein said sliders are sized so as to enable a user to grasp them using the user's thumbs and forefingers for movement of said sliders from intent to indent along said channels.

3. The eyewear of claim 1 wherein said first and second temples are semi-rigid and more flexible than said flexible strap.

4. The eyewear of claim 3 wherein said first and second temples comprise TR90 polymer.

5. The eyewear of claim 3 wherein said flexible strap comprises an elastomeric material.

6. The eyewear of claim 5 wherein said elastomeric material comprises a thermoplastic polyester elastomer.

7. The eyewear of claim 1 wherein said frame halves comprise magnets at their inner ends.

8. Eyewear comprising:
   a pair of lenses;
   a pair of frame halves, each frame half supporting a lens, said frame halves being releasably connected to one another at a bridge between said lenses at their inner ends and said frame halves having frame half outer ends on opposite sides of said lenses from said bridge;
   first and second temples of rigid but deformable opposing rails having a plurality of indents formed therein and having temple first ends and temple second ends, said temple first ends being pivotally connected to said frame halves outer ends, each temple comprising a channel defined by spacing between said opposing rails
   a flexible strap having first and second flexible strap ends;
   first and second sliders, each slider affixed to one end of said flexible strap at said first and second flexible strap ends, said sliders having protrusions such that said sliders deform the spacing between opposing rails at locations devoid of said indents;
   said first slider sized to be slidably positioned along said channel of said first temple and said second slider sized to be adjustably positioned along said channel of said second temple; and
   wherein movement of said sliders enables a user to selectively change the length of said flexible strap extending between said second ends of said first and second temples wherein inadvertent movement of said sliders within said channels is resisted by indent-protrusion contact between said sliders and channels.

9. A method of applying eyewear to the head of a user, said method comprising providing eyewear comprising:
   a pair of lenses;
   a pair of frame halves, each frame half supporting a lens, said frame halves being releasably connected to one another at a bridge between said lenses at their inner ends and said frame halves having frame half outer ends on opposite sides of said lenses from said bridge;
   first and second temples having temple first ends and temple second ends, said temple first ends being pivotally connected to said frame halves outer ends, each temple comprising a channel comprised of opposing rails defining said spacing and having indents formed therein;
   a flexible strap having first and second flexible strap ends;
   first and second sliders, each slider affixed to one end of said flexible strap at said first and second flexible strap ends, said sliders having protrusions;
   said first slider sized to be slidably positioned along said channel of said first temple and said second slider sized to be adjustably positioned along said channel of said second temple; and
   wherein movement of said sliders enables a user to selectively change the length of said flexible strap extending between said second ends of said first and second temples wherein inadvertent movement of said sliders within said channels is resisted by indent-protrusion contact between said sliders and channels;
   moving said sliders along said channels away from said frame halves for lengthening said flexible strap extending from said temples;
   separating said frame halves from one another at the frame halves inner ends at said bridge;
   applying the eyewear by connecting the frame halves at the bridge between the lenses with the flexible strap extending across the neck of the user; and
   moving said first and second sliders within said channels towards said frame halves to shorten the flexible strap that extends beyond said temples.

10. The method of claim 9 wherein said first and second sliders are moved within said channels toward the first ends of said first and second temples to the extent that said lenses are secured in front of the user's eyes preventing significant movement therefrom without unintended release of said frame halves from one another.

11. The method of claim 10 wherein said first and second sliders are moved within said channels such that each protrusion seats within an indent to resist inadvertent movement of said sliders within said channels.

* * * * *